UNITED STATES PATENT OFFICE.

WILLIAM HORSTMANN, OF NEW YORK, N. Y.

COMPOSITION FOR PLASTERING, FILLING, WALL-ORNAMENTS, &c.

SPECIFICATION forming part of Letters Patent No. 345,847, dated July 20, 1886.

Application filed March 1, 1886. Serial No. 193,655. (No specimens.)

*To all whom it may concern:*

Be it known that I, WILLIAM HORSTMANN, of the city, county, and State of New York, have invented certain new and useful Improvements in Composition for Plastering, Filling, Wall-Ornaments, &c., of which the following is a specification.

This invention relates to an improved plastering composition that is particularly to be used for filling the cracks in the plastering and wood-work of walls and ceilings, and also for hard-finishing walls and making ornamental center-pieces and other wall-ornaments; and the invention consists of a mixture of whiting, water, dextrine, boiled linseed-oil, and a suitable drier.

In preparing my composition I proceed in the following manner: I take sixty-four parts of whiting and mix it with sixteen parts of water. I then add four parts of dextrine which has been first dissolved in water, also ten parts of boiled linseed-oil, and three parts of brown japan or any other suitable drier. I obtain thereby a mass having the consistency of a thick paste, which keeps in moist state owing to the dextrine used, and which is packed up in cans and barrels, ready for use.

The composition is applied directly after opening the cans or barrels, without the admixture of water or other liquid, and used for filling the cracks of walls, ceilings, and wood-work. It dries slowly on exposure to the atmosphere, and forms then a firm and substantial filling for the cracks. When used as a hard-finish, it is allowed to dry for from twelve to twenty-four hours, according to the thickness of the finish, after which time the wall can be coated with paint or calcimine. When used for center-pieces or other wall-ornaments, they have to be given time for setting and drying.

Having thus described my invention, I claim as new and desire to secure by Letters Patent—

The plastering and filling composition herein described, composed of whiting, water, dextrine, boiled linseed-oil, and a suitable drier, substantially as set forth.

In testimony that I claim the foregoing as my invention I have signed my name in presence of two subscribing witnesses.

WILLIAM HORSTMANN.

Witnesses:
 PAUL GOEPEL,
 SIDNEY MANN.